US012110407B1

(12) United States Patent
Rolin et al.

(10) Patent No.: US 12,110,407 B1
(45) Date of Patent: Oct. 8, 2024

(54) CERAMIC-BASED HUMIDITY SENSITIVE MATERIAL WITH LIQUID POLYMERIC DELIVERY VEHICLE

(71) Applicant: United States of America as represented by the Administrator of NASA, Washington, DC (US)

(72) Inventors: Terry D. Rolin, Elkmont, AL (US); Cameroun Grace Sherrard, Huntsville, AL (US); Ian Kent Small, Centennial, CO (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 157 days.

(21) Appl. No.: 18/059,088

(22) Filed: Nov. 28, 2022

(51) Int. Cl.
| | |
|---|---|
| C09D 11/52 | (2014.01) |
| C09C 1/36 | (2006.01) |
| C09C 3/04 | (2006.01) |
| C09C 3/06 | (2006.01) |
| C09D 11/037 | (2014.01) |

(Continued)

(52) U.S. Cl.
CPC ............ *C09D 11/52* (2013.01); *C09C 1/3692* (2013.01); *C09C 3/041* (2013.01); *C09C 3/06* (2013.01); *C09D 11/037* (2013.01); *C09D 11/101* (2013.01); *C09D 11/102* (2013.01); *G01N 27/223* (2013.01); *C01P 2002/52* (2013.01); *C01P 2004/62* (2013.01); *C01P 2004/64* (2013.01); *C01P 2006/40* (2013.01)

(58) Field of Classification Search
None
See application file for complete search history.

(56) References Cited

U.S. PATENT DOCUMENTS

| | | | |
|---|---|---|---|
| 9,987,658 B1 * | 6/2018 | Rolin | C04B 35/6264 |
| 10,325,724 B2 | 6/2019 | Rolin et al. | |

(Continued)

FOREIGN PATENT DOCUMENTS

| | | |
|---|---|---|
| CN | 102108222 B | 6/2011 |
| JP | H04106165 A | 4/1992 |

OTHER PUBLICATIONS

G. Tarapata; "Humidity Sensor Printed on Textile With Use of Ink-Jet Technology", Dec. 2012, Procedia Engineering.

(Continued)

*Primary Examiner* — Shamim Ahmed
*Assistant Examiner* — Bradford M Gates
(74) *Attorney, Agent, or Firm* — Jerry L. Seemann; Trenton J. Roche

(57) ABSTRACT

A humidity sensitive material includes a lanthanum-doped barium titanate ($BaTiO_3$) co-doped with an alkali hydroxide. A polymeric liquid binder is used as a vehicle to deliver the humidity sensitive material to a substrate or electrode via a 3D-printing process. The humidity sensitive material is highly sensitive to changes in humidity and exhibits rapid and large changes in capacitance and impedance for just a relatively small change in humidity. The humidity sensitive material exhibits significantly large changes in impedance and capacitance over the entire 10-90% RH range. As a result of the high sensitivity of the humidity sensitive material, the log-linear response is significantly easier to calibrate in humidity sensing devices that use the humidity sensitive material.

20 Claims, 5 Drawing Sheets

(51) Int. Cl.
    *C09D 11/101*     (2014.01)
    *C09D 11/102*     (2014.01)
    *G01N 27/22*     (2006.01)

(56) References Cited

U.S. PATENT DOCUMENTS

| | | |
|---|---|---|
| 10,573,464 B2 | 2/2020 | Rolin et al. |
| 10,573,465 B2 | 2/2020 | Rolin et al. |
| 10,741,312 B2 | 8/2020 | Rentrop et al. |
| 11,193,031 B2 | 12/2021 | Pujari et al. |
| 2007/0182791 A1 | 8/2007 | Chung et al. |
| 2018/0286590 A1* | 10/2018 | Rolin .................. H01G 4/38 |

OTHER PUBLICATIONS

Miha Golob; "UV Energy Curing of Dielectric Layer for Screen Printed Capacitive Chemical Sensors", 2018, Published by University of Novi Sad, Department of Graphic Engineering and Design; (https://doi.org/10.24867/GRID-2018-p17).

D. Barmpakos; G. Kaltsas; "A Review on Humidity, Temperature and Strain Printed Sensors-Current Trends and Future Perspectives", Jan. 22, 2021, Sensors 21, No. 3: 739 (https://doi.org/10.3390/S21030739).

\* cited by examiner

CERAMIC-BASED HUMIDITY SENSITIVE MATERIAL WITH LIQUID POLYMERIC DELIVERY VEHICLE

ORIGIN OF THE INVENTION

The invention described herein was made by an employee of the United States Government and may be manufactured and used by or for the Government of the United States of America for governmental purposes without the payment of any royalties thereon or therefor.

CROSS-REFERENCES TO RELATED PATENT APPLICATIONS

None.

FIELD OF THE INVENTION

The present disclosure relates to a ceramic-based humidity sensitive material that is printable via a liquid polymeric binder.

BACKGROUND

Conventional methods for forming ceramic-based dielectric material for use in forming humidity sensitive material are extensive processes entailing multiple cumbersome steps. Typically, the base materials barium oxide, titanium oxide and lanthanum hydroxide are mixed and heated in a range of 1000-1300° C. to generate a sintered mixture. Further complex steps are necessary to create a printable humidity sensing material from this sintered mixture. Glass particles, surfactants, solvents, organic vehicles, binders, and co-dopants are incorporated into the sintered mixture to yield a liquid mixture. A layer of the liquid mixture is then deposited onto a substrate via a screen-printing method which is similar to that used in printing semiconductors. Once the layer is deposited onto the substrate, extensive processing is required to remove the liquid portions from the layer. Such processing includes the steps of drying the liquid by removing volatile polymers (100-200° C.), burning out higher viscosity polymers (200-400° C.), and cycling between heating at 850-900° C. and cooling in a nitrogen atmosphere. The aforementioned extensive processing steps are cumbersome and time consuming and therefore limit the ability to mass manufacture humidity sensors using this humidity sensing material.

What is needed is a new method of manufacturing a humidity sensing material. The new method must eliminate the inconvenient firing stages currently required in the above-described conventional method and also allow for simple curing at low temperatures by room-temperature thermal curing, low-temperature heating, laser curing, ultraviolet (UV) curing and any combination thereof.

SUMMARY

A summary of certain embodiments disclosed herein is set forth below. It should be understood that these aspects are presented merely to provide the reader with a brief summary of these certain embodiments and these aspects are not intended to limit the scope of this disclosure or the claimed subject matter. Indeed, this disclosure may encompass a variety of aspects that may not be set forth below.

Embodiments of a humidity sensing material are disclosed herein. The humidity sensing material includes a lanthanum-doped barium titanate ($BaTiO_3$) co-doped with an alkali hydroxide A polymeric liquid binder is used as a vehicle to deliver the humidity sensing material to a substrate or electrode via a 3D-printing process. The humidity sensing material is highly sensitive to changes in humidity and, when used in capacitive-type and resistive-type humidity sensing devices, exhibits rapid and large changes in capacitance and impedance, respectively, for just a relatively small amount of humidity change. The humidity sensing material exhibits significantly large changes in impedance and capacitance over the entire 10-90% RH range. As a result of the high sensitivity of the humidity sensing material, the log-linear response is significantly easier to calibrate in humidity sensing devices that incorporate the humidity sensing material.

Embodiments of a method of producing the aforementioned humidity sensing material are described herein. An exemplary embodiment of this method uses particles of barium oxide having an average grain diameter in a range of 20-120 nanometers, particles of titanium dioxide having an average grain diameter in a range of 20-120 nanometers and particles of lanthanum hydroxide having an average grain diameter in range of 20-120 nanometers. The particles are mixed in a proportion defined by 60-70 weight percent of the particles of barium oxide, 30-40 weight percent of the particles of titanium dioxide and 0.2-5.0% weight percent of the particles of lanthanum hydroxide so as to produce a mixture of particles. The mixture of particles is heated in a nitrogen environment to a temperature in a range of 1150-1250° C. so as to produce a sintered mixture. The sintered mixture is then cooled in the nitrogen environment and then milled to produce milled particles having diameters within a range of 50-700 nanometers. A 95-99 weight percent of the milled particles is mixed with 1.0-5.0 weight percent of an alkali hydroxide to produce a composite dielectric material. The composite dielectric material is then milled to produce a composite dielectric powder. The composite dielectric powder is heated in a nitrogen atmosphere at a temperature that is less than or equal to 850° C. The composite dielectric powder is then cooled in the nitrogen atmosphere. At the next step, a 70-80 weight percent of the composite dielectric powder is mixed with a 20-30 weight percent of a liquid polymeric binder to form a homogenous liquid mixture. A layer of the homogenous liquid mixture is then deposited onto a substrate. A printing technique, such as 3D printing, may be used to deposit the layer of the homogeneous liquid mixture onto the substrate. The substrate with the layer thereon is processed to remove liquid portions of the liquid mixture. Processing the substrate and the layer of homogenous liquid mixture may be accomplished with room-temperature thermal curing, laser curing, ultraviolet (UV) curing or a combination laser curing and ultraviolet curing. In exemplary embodiments, the substrate having the cured layer of homogeneous liquid mixture may be used to fabricate humidity sensing components. In such components, the cured layer exhibits changes in capacitance and impedance in response to changes in an environment's humidity.

Some embodiments described herein reference a method of producing a humidity sensing material comprising the steps of providing particles of barium oxide, titanium dioxide and lanthanum hydroxide, wherein all of the particles have an average grain diameter in a range of 20-120 nm, and then mixing 60-70 weight percent of the particles of barium oxide, 30-40 weight percent of the particles of titanium dioxide and 0.2-5.0% weight percent of the particles of lanthanum hydroxide so as to form a mixture of particles. The mixture of particles is heated at a temperature in a range of 1150-1350° C. in a nitrogen atmosphere for a first predetermined amount of time so as to form a sintered mixture. The sintered mixture is then cooled in the nitrogen atmosphere. Thereafter, the sintered mixture is milled to produce milled particles having diameters within a range of 50-700 nm. The method further includes mixing 95-99 weight percent of the milled particles and 1.0-5.0 weight percent of an alkali hydroxide selected from the group consisting of potassium hydroxide, sodium hydroxide, rubidium hydroxide and lithium hydroxide to form a composite dielectric material. The composite dielectric material is then milled to produce a composite dielectric powder. The composite dielectric powder is then heated in a nitrogen atmosphere at a temperature less than or equal to 850° C. The composite dielectric powder is then cooled in the nitrogen atmosphere. The next step entails mixing 70-80 weight percent of the composite dielectric powder and 20-30 weight percent of a liquid epoxy binder to produce a homogenous liquid mixture. The method further comprises depositing a layer of the homogeneous liquid mixture onto a substrate and then processing the substrate and the layer to remove liquid portions of the homogeneous liquid mixture.

Some embodiments described herein reference a method of manufacturing a humidity sensor. The method comprises providing particles of barium oxide, titanium dioxide and lanthanum hydroxide, wherein all of the particles have an average grain diameter in a range of 20-120 nanometers. The method includes mixing 60-70 weight percent of the particles of barium oxide, 30-40 weight percent of the particles of titanium dioxide and 0.2-5.0% weight percent of the particles of lanthanum hydroxide so as to form a mixture of particles. The mixture of particles is then heated in a nitrogen atmosphere at a first predetermined temperature for a first predetermined amount of time so as to form a sintered mixture. Thereafter, sintered mixture is cooled in the nitrogen atmosphere. The cooled sintered mixture is milled to produce milled particles having diameters within a range of 50-700 nanometers. The method further includes mixing 95-99 weight percent of the milled particles and 1.0-5.0 weight percent of an alkali hydroxide so as to form a composite dielectric material. The composite dielectric material is then milled to form a composite dielectric powder. The composite dielectric powder is then heated in a nitrogen atmosphere at a second predetermined temperature for a second predetermined amount of time. Thereafter, the composite dielectric powder is cooled in the nitrogen atmosphere. The method includes mixing 70-80 weight percent of the composite dielectric powder and 20-30 weight percent of a liquid polymeric binder to form a homogenous liquid mixture. The method further includes providing a first electrode, printing a layer of the homogeneous liquid mixture onto the first electrode, processing the first electrode with the layer thereon to remove liquid portions of the homogeneous liquid mixture, and thereafter, providing a second electrode on the layer after the liquid portions of the liquid mixture have been removed.

Some embodiments described herein reference a method of manufacturing a humidity sensor, wherein the method comprises providing a substrate having a first electrode and a second electrode, wherein the first electrode and the second electrode are separated by an electrode gap. The method includes providing particles of barium oxide, titanium dioxide and particles of lanthanum hydroxide, wherein all of the particles have an average grain diameter in a range of 20-120 nanometers. The method includes mixing 60-70 weight percent of the particles of barium oxide, 30-40 weight percent of the particles of titanium dioxide and 0.2-5.0% weight percent of the particles of lanthanum hydroxide so as to form a mixture of particles. The mixture of particles is heated in a nitrogen atmosphere at a first predetermined temperature for a first predetermined amount of time so as to produce a sintered mixture. The sintered mixture is then cooled in the nitrogen atmosphere. Thereafter, the sintered mixture is milled to produce milled particles having diameters within a range of 50-700 nanometers. The method further includes the steps of mixing 95-99 weight percent of the milled particles and 1.0-5.0 weight percent of an alkali hydroxide to provide a composite dielectric material, milling the composite dielectric material to form a composite dielectric powder, heating the composite dielectric powder in a nitrogen atmosphere at a second predetermined temperature for a second predetermined amount of time and cooling the composite dielectric powder in the nitrogen atmosphere. The method further includes mixing 70-80 weight percent of the composite dielectric powder and 20-30 weight percent of a liquid polymeric binder to form a homogenous liquid mixture. Thereafter, the layer of the homogeneous liquid mixture is printed onto the substrate so as to fill the electrode gap and cover portions of the first electrode and second electrode. The substrate with the layer thereon is then processed to remove liquid portions of the homogeneous liquid mixture.

DETAILED DESCRIPTION

Figure 1:
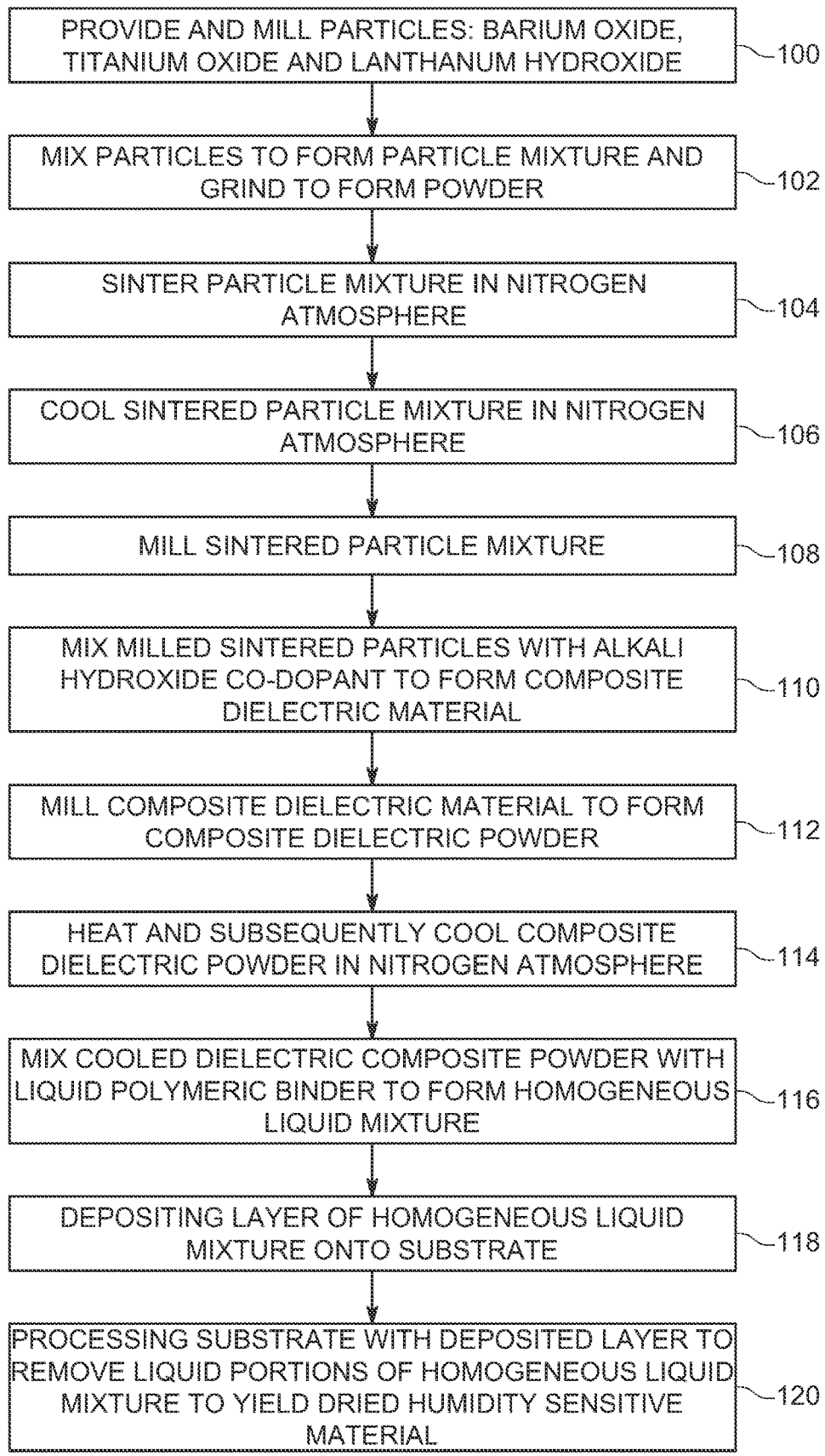
FIG. 1 is a flow diagram of a method of forming a humidity sensitive material in accordance with an embodiment of the present disclosure.

Reference in the specification to "an exemplary embodiment", "one embodiment" or "an embodiment" means that a particular feature, structure or characteristic described in connection with the embodiment is included in at least one embodiment of the invention. The appearances of the phrases "an exemplary embodiment", "one embodiment" or "an embodiment" in various places in the specification are not necessarily all referring to the same embodiment.

As used herein, the terms "comprises", "comprising", "includes", "including", "has", "having" or any other variation thereof, are intended to cover a non-exclusive inclusion. For example, a process, method, article or apparatus that comprises a list of elements is not necessarily limited to only those elements, but may include other elements not expressly listed or inherent to such process, method, article or apparatus.

As used in this document, the singular form "a", "an" and "the" include plural references unless the context clearly dictates otherwise. Unless defined otherwise, all technical and scientific terms used herein have the same meanings as commonly understood by one of ordinary skill in the art.

Approximating language, as used herein throughout the specification and claims, may be applied to modify any quantitative representation that could permissibly vary without resulting in a change in the basic function to which it is related. Accordingly, a value modified by a term such as "about", "approximately" or "approximate" is not limited to the precise value specified.

As used herein, the term "humidity" refers to an environment's relative humidity (RH) that is a percentage ratio of actual water vapor pressure to the saturation vapor pressure as is well understood in the art.

The humidity sensitive material disclosed herein comprises a lanthanum-doped barium titanate-based ceramic material. A dopant of the lanthanum-doped barium titanate-based ceramic material is selected from the group consisting of lanthanum hydroxide and lanthanum oxide. In an exemplary embodiment, the dopant is lanthanum hydroxide. The lanthanum-doped barium titanate-based ceramic material includes an alkali hydroxide co-dopant selected from the group consisting of potassium hydroxide, sodium hydroxide, rubidium hydroxide and lithium hydroxide. In an exemplary embodiment, the co-dopant is potassium hydroxide. The humidity sensitive material disclosed herein exhibits a significantly high relative permittivity value in the range of $\approx 10^5$. Hence, this humidity sensitive material is highly sensitive to changes in humidity and, when used in capacitance-based or impedance-based humidity sensing components, the humidity sensitive material exhibits rapid and large changes in capacitance and impedance for just a relatively small change in humidity. The humidity sensing material exhibits significantly large impedance and capacitance values over the entire 10-90% RH range. Testing of the humidity sensitive material found that it exhibits recovery rates under 1.0 second for a step change of 63% RH. Thus, for an instantaneous RH change from 30% to 93%, the capacitance of the humidity sensitive material changes and then stabilizes within 1.0 second. This important characteristic of the humidity sensitive material allows it to be used for quick detection of volatile vapors in critical environments such as the International Space Station or other manned spacecraft. As a result of the high sensitivity of the humidity sensitive material, the log-linear response may be easily calibrated in humidity sensing devices that use the humidity sensitive material. The high sensitivity of the humidity sensitive material, even with minute thicknesses of 30 micrometers, allows the production of a humidity sensor having a low mass and a relatively small environmental footprint. Such a humidity sensor may be used in a variety of complex applications such as space suits, sensitive hygrometers, electronic weather stations, aerospace vehicles and any application requiring fast and sensitive responses to humidity changes.

Referring to FIG. 1, there is shown a flow diagram of a method of manufacturing a humidity sensitive material in accordance with an exemplary embodiment of the present disclosure. The humidity sensitive material is formed from particular base material components that include barium oxide (BaO), titanium oxide ($TiO_2$) and a trivalent rare earth hydroxide. The trivalent rare earth hydroxide is selected from the group consisting of lanthanum hydroxide ($La(OH)_3$) and lanthanum oxide ($La_2O_3$). In this embodiment, the trivalent rare earth hydroxide is lanthanum hydroxide. At step 100, the base materials barium oxide, titanium oxide and lanthanum hydroxide are provided in the form of raw oxides so that the final particle size of each base material is below 500 nanometers (nm). Step 100 may include the step of milling each of the base materials to a specific particle size. Specifically, the barium oxide is milled to provide an average grain diameter in a range of 20-120 nanometers, the titanium oxide is milled to provide an average grain length in a range of 20-120 nanometers and the particles of lanthanum hydroxide are milled to provide an average grain length in a range of 20-120 nanometers. At step 102, the base materials are mixed together in the following weight percent proportions: 60-70 weight percent barium oxide, 30-40 weight percent titanium oxide and 0.2-5.0 weight percent lanthanum hydroxide. Mixing these base materials together forms a particle mixture.

The particle mixture formed at step 102 is ground for at least a predetermined minimum amount of time so that the particle mixture is transformed into a powder. In an exemplary embodiment, the predetermined minimum amount of time is about 2.5 hours. In some embodiments, an automatic electric mortar and pestle is used to grind the mixture into the powder. An amount of the powder is disposed into a container, such as a high purity Alumina ($Al_2O_3$) boat crucible. In an exemplary embodiment, the amount of powder is about 40 grams. However, the amount of powder disposed into the container may vary depending upon the quantity of humidity sensing components that are to be produced.

At step 104, the boat crucible holding the powder is placed in a furnace in a pure gaseous nitrogen (GN2) environment or atmosphere, or in a furnace capable of high vacuum ($>1\times 10^{-3}$ torr), and heated at a first predetermined temperature for a predetermined amount of time to produce a sintered mixture. In an exemplary embodiment, the first predetermined temperature is in a range of 1150° C. and 1350° C. and the predetermined amount of time is in a range of 5.5 hours and 6.5 hours. In one embodiment, the predetermined temperature is about 1250° C. and the predetermined amount of time is about 6.0 hours. In such an embodiment, the furnace is heated at a rate of 10° C./min to 300° C. and then held at that temperature for about 30 minutes. The temperature is then increased at a rate of 10° C./min to 1250° C.

At step 106, the sintered mixture is allowed to cool in the flowing GN2 environment or at high vacuum. In an exemplary embodiment, this is accomplished by allowing the temperature in the furnace to decrease to a predetermined lower temperature. In one embodiment, the predetermined lower temperature is about 50° C. Once the interior temperature of the furnace decreases to about the predetermined lower temperature, the container (e.g. alumina boat crucible) is removed from the furnace.

At step 108, the sintered mixture is milled to produce milled particles having diameters in a range of 50-700 nanometers. This step may be implemented with an automatic electric mortar and pestle. At step 110, a predetermined amount of the milled particles is mixed with an alkali hydroxide co-dopant in order to produce a composite dielectric material. Suitable alkali hydroxide co-dopants include potassium hydroxide, sodium hydroxide, rubidium hydroxide and lithium hydroxide. In an exemplary embodiment, the alkali hydroxide co-dopant is dry potassium hydroxide (KOH). The milled particles and potassium hydroxide are mixed together in the following weight percent proportions: 95-99 weight percent milled particles and 1.0-5.0 weight percent potassium hydroxide. The actual amount of potassium hydroxide depends upon the desired sensitivity of the resulting humidity sensitive material. The milled particles and potassium hydroxide are thoroughly mixed so as to disperse the potassium hydroxide and provide a dry composite dielectric material. A spatula or similar tool can be used to mix the milled particles and potassium hydroxide.

At step 112, the composite dielectric material is ground and mixed for a predetermined amount of time in order to provide a composite dielectric powder. In an exemplary embodiment, the predetermined amount of time is in a range of 2-3 hours. This step may be implemented with an automatic electric mortar and pestle.

At step 114, the composite dielectric powder formed in step 112 is poured into another container (e.g. alumina boat) and placed into a firing oven in a pure GN2 (nitrogen gas) atmosphere or into a vacuum oven having a vacuum greater than $1 \times 10^{-3}$ torr. The composite dielectric powder is then heated to temperature in a range of 800-850° C. for about 10-30 minutes. In some embodiments, the composite dielectric powder is heated for about 10-12 minutes. The temperature ramp-up rate and temperature ramp-down rate are maintained to slow grain growth. In an exemplary embodiment, the temperature ramp-up rate to 300° C. is about 10° C./minute wherein the temperature is maintained at 300° ° C. for about 10 minutes. The temperature is then ramped up to 850° C. at a rate of about 10° C./minute. After the composite dielectric powder is heated for the requisite time, the composite dielectric powder is subsequently cooled while still within the pure GN2 (nitrogen gas) environment or atmosphere. The furnace temperature is ramped down to 300° ° C. at a rate of about 10° C./minute. The furnace temperature is then maintained at 300° ° C. for about 10 minutes. The furnace is then deactivated so as to allow the temperature in the furnace to slowly decrease to a temperature in a range of 20-60°. The container holding the cooled composite dielectric powder is then removed from the furnace.

At step 116, the composite dielectric powder is then poured into a mixing container and mixed with a liquid polymeric binder to form a homogeneous liquid mixture that exhibits a humidity sensing characteristic when cured. The composite dielectric powder is mixed with the liquid polymeric binder in the following weight proportions:

70-80 weight percent dielectric composite powder, and
20-30 weight percent liquid polymeric binder.

The 70-80 weight percent proportion of composite dielectric powder ensures that the composite dielectric powder meets the percolation threshold in order to be RH sensitive. In an exemplary embodiment, the ratio of composite dielectric powder to liquid polymeric binder is about 2.4:1. Examples of a suitable liquid polymeric binder include, but are not limited to, normal epoxy, shaped epoxy, pressed epoxy, acrylate modified epoxy, urethane, photo-reactive resins and silicone. Examples of photo-reactive resins include an ultraviolet (UV) sensitive resin and UV curable resins. In one embodiment, the liquid polymeric binder is an epoxy. In an exemplary embodiment, the liquid polymeric binder is produced by forming a solution of the commercially available EpoThin™ Epoxy and EpoThin™ Hardener wherein the resin-to-hardener weight ratio is about 5:1.

In some embodiments, step 116 may include the addition of a surfactant to the liquid polymeric binder and composite dielectric powder in order to improve the loading of the composite dielectric powder in the liquid polymeric binder. Specifically, the surfactant increases dissolution of the composite dielectric powder in the liquid polymeric binder by decreasing the viscosity of the liquid polymeric binder. In some embodiments, the surfactant is selected from the group consisting of phosphate esters. For example, the surfactant may be a tridecyl alcohol ethoxylate phosphate ester. One suitable commercially available surfactant is Dextrol™ OC-40 phosphate ester surfactant. Another suitable commercially available surfactant is Stepfac™ 8180 ethoxylated phosphate ester. Other suitable surfactants include polyvinylpyrrolidone K10, polyvinylpyrrolidone K15, oleic acid and isopropyl alcohol (IPA).

Figure 2A:
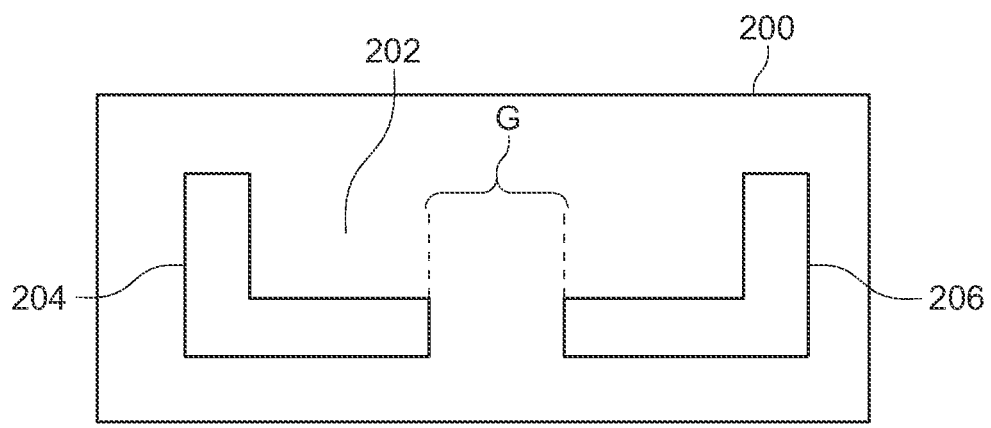
FIG. 2A illustrates a top view of a substrate with electrodes prior to the deposition of the homogenous liquid mixture formed in accordance with the method illustrated in FIG. 1.

In step 118, the homogeneous liquid mixture formed in step 116 is ready to be deposited onto a substrate in order to form a humidity sensing component that provides measurements of impedance or capacitance as a function of relative humidity (RH). Accordingly, the humidity sensing component may have a resistor-type configuration wherein each value of impedance corresponds to a specific % RH value or a capacitor-type configuration wherein each value of capacitance corresponds to a specific % RH value. The homogenous liquid mixture has a viscosity and texture that allows it to be used in the same manner as an ink. Accordingly, the homogenous liquid mixture may be printed onto the substrate surface. In some embodiments, a 3D printing process is used to print the homogenous liquid mixture onto the substrate surface. Any suitable 3D printing device capable of printing thick film inks may be used. Some examples of suitable 3D printing devices are the commercially available nScrypt 3Dn-300 printer and the Voltera V-One printer. Referring to FIG. 2A, there is shown a plan view of substrate 200 that has surface 202 upon which the homogenous liquid mixture is to be printed. Electrically conductive electrodes 204 and 206 that are formed upon, joined or attached to substrate 200 by any suitable technique or process. In some embodiments, substrate 200 is an alumina substrate and electrodes 204 and 206 are pre-processed and joined to substrate 200. In some embodiments, electrodes 204 and 206 are gold-platinum electrodes. In other embodiments, electrodes 204 and 206 are silver-palladium electrodes. Electrodes 204 and 206 are separated by an electrode gap G. In an exemplary embodiment, electrode gap G is in a range of 0.5 mm and 2.0 mm. The layer of the homogenous liquid mixture, formed in step 116, is printed on substrate 200 so that the homogenous liquid mixture covers the electrode gap G and portions of electrodes 204 and 206. Substrate 200 having the uncured layer of homogenous liquid mixture thereon is referred to as "wet substrate 200" in the ensuing description.

Figure 2B:
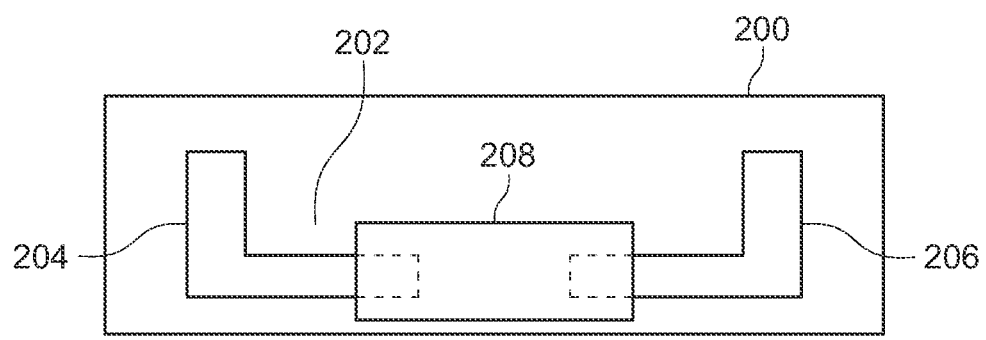
FIG. 2B illustrates a top view of the substrate of FIG. 2A wherein the humidity sensing material formed in accordance with the method illustrated in FIG. 1 is disposed over the gap between the electrodes as well as portions of the electrodes so as to form a humidity sensing component having a resistor-type configuration that allows impedance to be measured as a function of relative humidity.
Figure 2C:
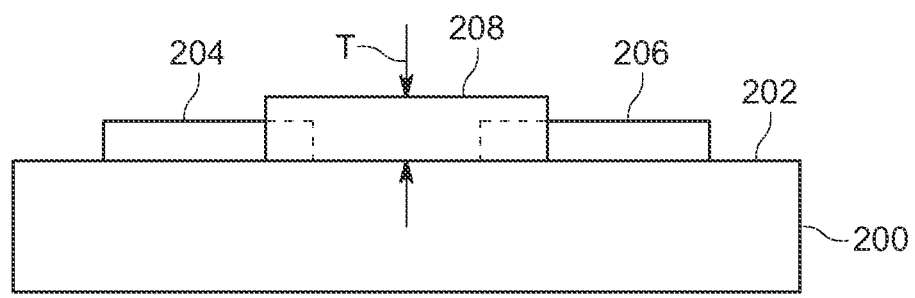
FIG. 2C illustrates a side view of the substrate as shown in FIG. 2B.

At step 120, wet substrate 200 is cured to remove the liquid portions of the layer of homogenous liquid mixture. Curing may be implemented by any suitable curing procedure, such as room-temperature thermal curing, laser curing, ultraviolet (UV) curing or any combination thereof. Curing may be done at very low temperatures, including room temperature, depending upon the particular liquid polymeric binder that is selected. For example, if epoxy is the selected liquid polymeric binder, then curing may be accomplished by simply leaving wet substrate 200 out on a laboratory table at room temperature for an amount of time that is in a range of 6-8 hours. Alternatively, curing may be accomplished by heating wet substrate 200 with a basic hotplate at a temperature of about 110° C. to expedite curing to a total amount of time in a range of 30-60 minutes. Referring to FIG. 2B, curing wet substrate 200 yields humidity sensitive material 208 that covers the electrode gap G and portions of electrodes 204 and 206. The portions of electrodes 204 and 206 covered by humidity sensitive material 208 are shown in phantom. Referring to FIG. 2C, in some embodiments, humidity sensitive layer 208 has a thickness T in a range of 1-50 micrometers. In FIG. 2C, the portions of electrodes 204 and 206 that are covered by humidity sensitive material 208 are shown in phantom. The arrangement of electrodes 204 and 206 and humidity sensitive material 208 provide a resistor-type sensing component wherein humidity sensitive material 208 exhibits changes in its impedance spanning several orders of magnitude as the relative humidity (% RH) changes. This resistor-type sensing component may be used with other circuits and devices such as gauges, LCR (inductance-capacitance-resistance) meters and other circuitry to provide read-outs of impedance and RH.

The liquid polymeric binder functions as a delivery vehicle that allows the homogeneous liquid mixture to be 3D printed on the substrate and cured by any of the aforementioned curing techniques. The humidity sensing function is performed by the ceramic-based powder that is mixed with the liquid polymeric binder at step 116. The high concentration of ceramic particles in the homogeneous liquid mixture (e.g. 70-80 weight percent) enables the ceramic particles to attain percolation and sense moisture.

Figure 3:
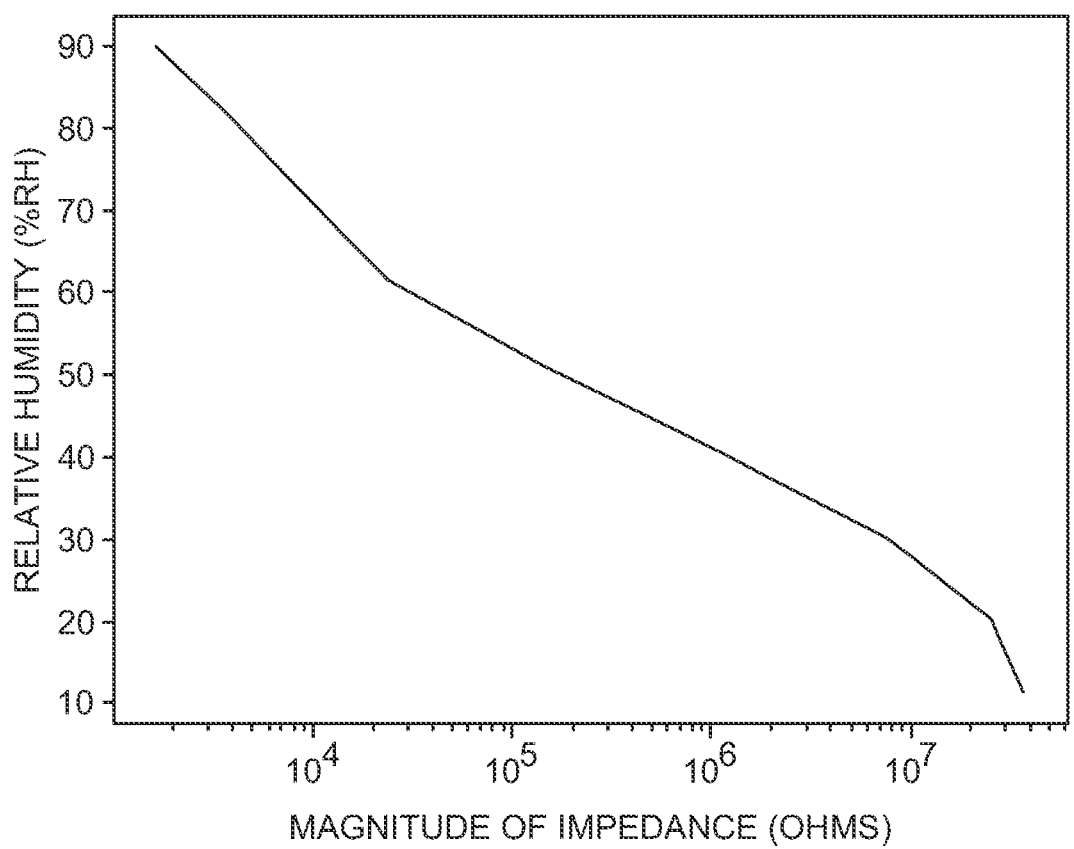
FIG. 3 is a plot of impedance as a function of relative humidity based on data obtained from a humidity sensing component that incorporates the humidity sensitive material formed according to the method shown in FIG. 1 and which has a resistor-type configuration.

FIG. 3 is a plot of impedance as a function of relative humidity based on data obtained from a humidity sensing component that incorporates the humidity sensitive material formed according to the above-described method and which has a resistor-type configuration. The plot shows impedance as a function of changing humidity, from 10-90% RH. The particle mixture of barium oxide, titanium oxide and lanthanum hydroxide was heated to 1250° C., the alkali hydroxide co-dopant was potassium hydroxide and the liquid polymeric binder was a pressed epoxy. The data shown in the plot is based on a temperature of 25.0° C. and a 25 Hz signal applied to the humidity sensing component. The 4th order magnitude change in impedance and the near log/linear response demonstrates the high-sensitivity of such a resistor-type electronic component to changes in RH.

Figure 4:
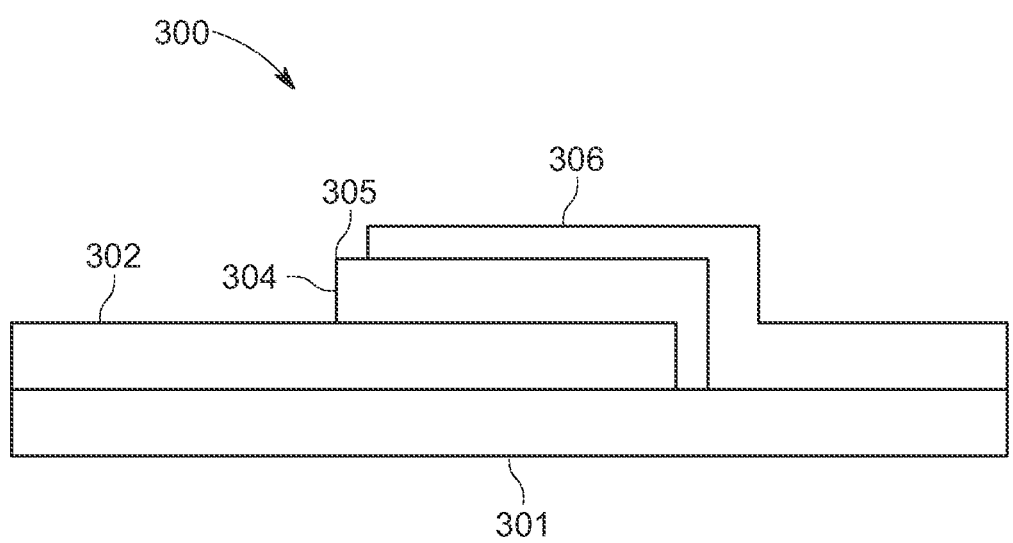
FIG. 4 is a side elevational view of a capacitor-type humidity sensing component that incorporates the humidity sensitive material formed according to the method shown in FIG. 1 and which allows capacitance to be measured as a function of relative humidity.

Referring to FIG. 4, there is shown humidity sensing component 300 that incorporates the humidity sensitive material made in accordance with the above-described method and which has a capacitor-type configuration. Component 300 includes substrate 301. In some embodiments, substrate 301 is an alumina substrate. Component 300 further includes electrically conductive bottom electrode 302. In an exemplary embodiment, bottom electrode 302 is printed using a 3D printing process. A layer of the homogeneous liquid mixture formed in step 116 is printed on top of bottom electrode 302 via a 3D printing process and then cured so as to yield a layer of humidity sensitive material 304. Electrically conductive top electrode 306 is then printed on a portion of substrate 301 and on top of the layer of humidity sensitive material 304 via a 3D printing process without contacting bottom electrode 302. In some embodiments, the 3D printing of top electrode 306 is halted just before reaching edge 305 of humidity sensing material 304 so that none of the 3D printing spray contacts bottom electrode 302. In an exemplary embodiment, layer of humidity sensing material 304 has a thickness of about 30-50 micrometers. The capacitance of humidity sensitive material 304 changes in response to changing humidity (e.g. 10-90% RH) wherein a particular capacitance value corresponds to a specific % RH value. Humidity sensing component 300 may be used with other circuits and devices such as gauges, LCR (inductance-capacitance-resistance) meters and other circuitry to provide read-outs of capacitance and RH.

Figure 5:
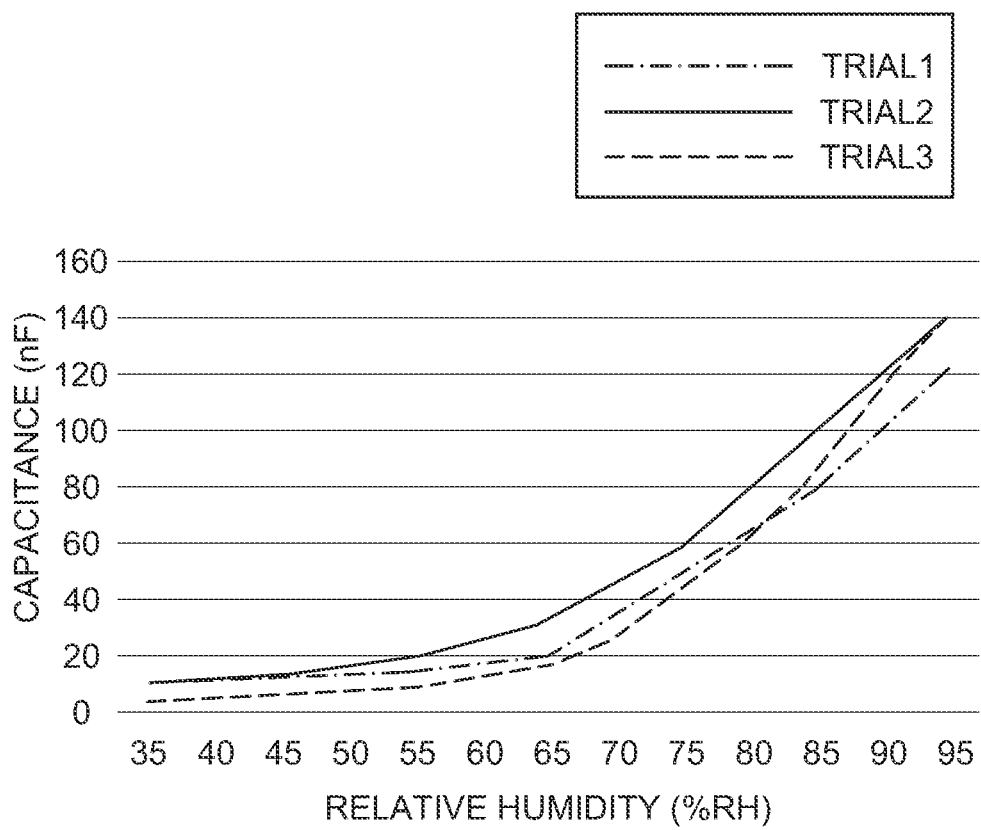
FIG. 5 shows a plot of capacitance as a function of relative humidity based on data obtained from three separate trials of sample humidity sensing components incorporating the humidity sensitive material formed according to the method shown in FIG. 1.

FIG. 5 shows three plots of data for three trials performed on humidity sensing components that incorporate the humidity sensitive material formed in accordance the above-described method and which have capacitor-type configurations. The particle mixture of barium oxide, titanium oxide and lanthanum hydroxide was heated to 1250° C., the alkali hydroxide co-dopant was potassium hydroxide and the liquid polymeric binder was a pressed epoxy. An isopropyl alcohol (IPA) surfactant was added to the composite dielectric powder and liquid polymeric binder to form the homogenous liquid mixture in step 116. The weight percent proportion of the composite dielectric powder in the homogenous liquid mixture was about 80 weight percent. Both laser and UV curing was used to cure the homogenous liquid mixture formed in step 116. The plots show changes in capacitance exhibited by the humidity sensitive material over the relative humidity range of 35-95% RH at a temperature of 25.0° C. and with a 25 Hz input signal.

Figure 6:
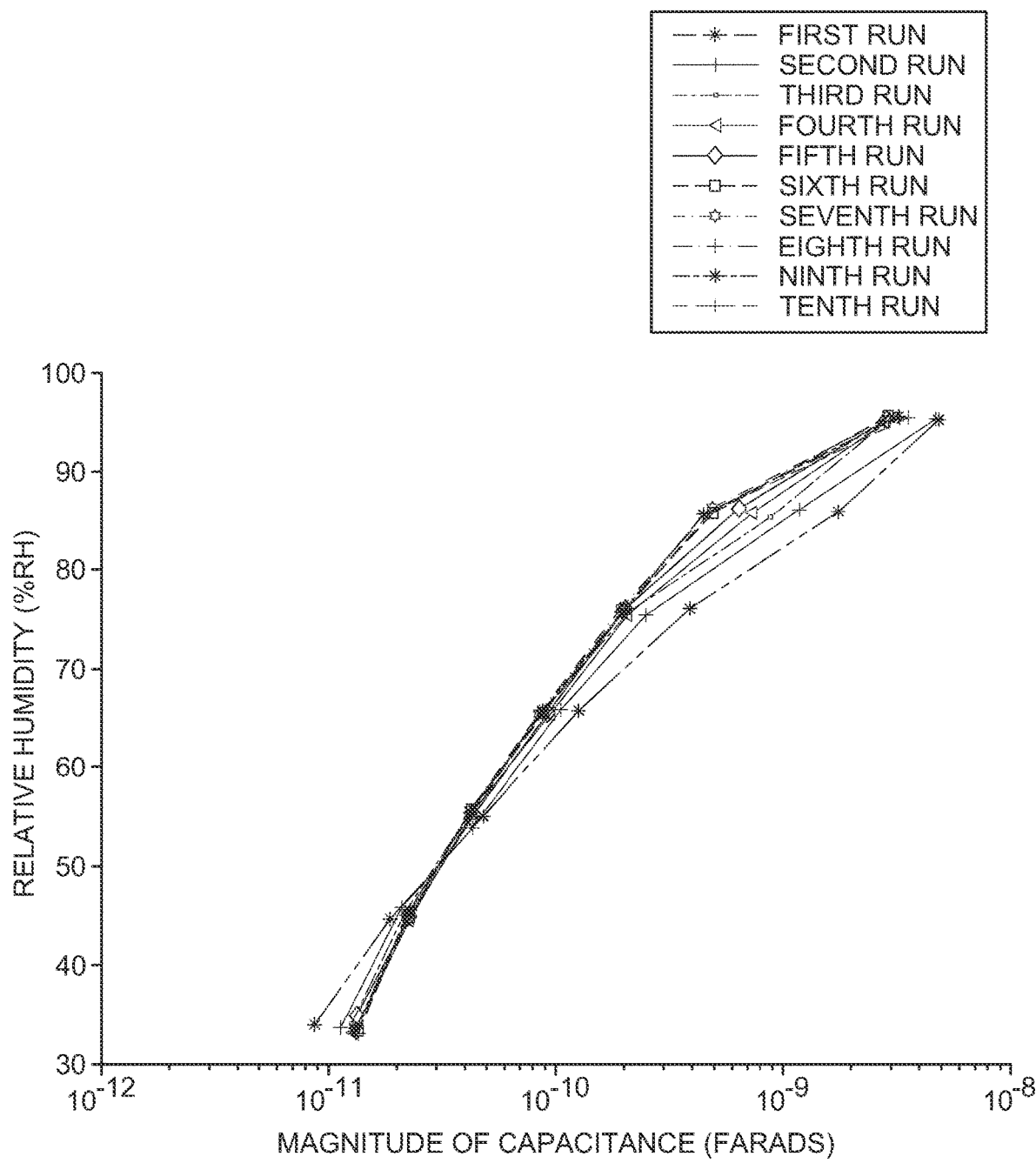
FIG. 6 shows multiple plots of capacitance as a function of relative humidity for a sample humidity sensing component incorporating the humidity sensitive material formed according to the method shown in FIG. 1.

FIG. 6 shows multiple plots of capacitance as a function of relative humidity for a sample humidity sensing component incorporating the humidity sensitive material formed according to the method shown in FIG. 1. For this sample humidity sensing component, the particle mixture of barium oxide, titanium oxide and lanthanum hydroxide was heated to 1150° C. in step 104, the alkali hydroxide co-dopant was potassium hydroxide and the liquid polymeric binder was a pressed epoxy. The tests were conducted at 25° C. and the electrical input signal was an alternating current (AC) signal having a low frequency of 20 Hz so as to simulate a DC input signal. As shown by the plots, the sample humidity sensing component demonstrates repeatability of the large log-linear capacitance response to broad changes in relative humidity (RH).

The method disclosed herein produces a highly-sensitive humidity sensitive material that may be readily incorporated into a variety of electronic circuits that are configured to use electrical signals to represent the intrinsic changes in capacitance and impedance of the humidity sensitive material over an entire range of RH. The sensitivity of the humidity sensitive material spans over a broad range of relative humidity values. Specifically, a relatively small amount of the humidity sensitive material exhibits changes in its capacitance and impedance spanning many orders of magnitude from 10-90% RH.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:
1. A method of producing a humidity sensitive material, comprising:
provided particles of barium oxide, titanium dioxide and lanthanum hydroxide, wherein all of said particles have an average grain diameter in a range of 20-120 nanometers;
mixing 60-70 weight percent of said particles of barium oxide, 30-40 weight percent of said particles of titanium dioxide and 0.2-5.0% weight percent of said particles of lanthanum hydroxide to provide a mixture of particles;
heating the mixture of particles in a nitrogen atmosphere at a first predetermined temperature for a first predetermined amount of time to form a sintered mixture;
cooling the sintered mixture in the nitrogen atmosphere;
milling the sintered mixture to produce milled particles having diameters in a range of 50-700 nanometers;
mixing 95-99 weight percent of said milled particles and 1.0-5.0 weight percent of an alkali hydroxide to form a composite dielectric material;
milling the composite dielectric material to form a composite dielectric powder;
heating the composite dielectric powder in a nitrogen atmosphere at a second predetermined temperature for a second predetermined amount of time;
cooling the composite dielectric powder in the nitrogen atmosphere;
thereafter mixing 70-80 weight percent of said composite dielectric powder and 20-30 weight percent of a liquid polymeric binder to form a homogenous liquid mixture;
depositing a layer of the homogeneous liquid mixture onto a substrate; and
processing said substrate with said layer thereon to remove liquid portions of said liquid mixture.

2. The method according to claim 1 wherein in said step of heating the mixture of particles, the first predetermined temperature is in a range of 1150-1350° C. and the first predetermined amount of time is in a range of 5-6 hours.

3. The method according to claim 1 wherein the step of milling the composite dielectric material to provide a composite dielectric powder is implemented for 2-3 hours.

4. The method according to claim 1 wherein in the step of heating the composite dielectric powder, the second predetermined temperature is less than or equal to 850° C. and the second predetermined amount of time is in a range of 10-30 minutes.

5. The method according to claim 1 wherein the alkali hydroxide is selected from the group consisting of potassium hydroxide, sodium hydroxide, rubidium hydroxide and lithium hydroxide.

6. The method according to claim 1 wherein said step of processing the substrate with said layer thereon comprises allowing said layer to cure at room temperature.

7. The method according to claim 1 wherein said step of processing the substrate with said layer thereon comprises heating the substrate with said layer at a temperature that is less than or equal to 110° C.

8. The method according to claim 1 wherein said step of processing the substrate with said layer thereon comprises curing said layer with ultraviolet (UV) light.

9. The method according to claim 1 wherein said step of processing the substrate with said layer thereon comprises curing said layer with a laser.

10. The method according to claim 1 wherein said step of processing the substrate with said layer thereon comprises curing said layer with a laser and ultraviolet (UV) light.

11. The method according to claim 1 further comprising mixing a surfactant with the homogenous liquid mixture so as to lower the viscosity of the liquid polymeric binder and increase the dissolution of the composite dielectric powder in the liquid polymeric binder.

12. The method according to claim 11 wherein the surfactant is a phosphate ester.

13. The method according to claim 1 wherein liquid polymeric binder is an epoxy.

14. The method according to claim 1 wherein the liquid polymeric binder is a photoreactive resin.

15. A method of producing a humidity sensing material, comprising:
providing particles of barium oxide, titanium dioxide and lanthanum hydroxide, wherein all of said particles have an average grain diameter in a range of 20-120 nm;
mixing 60-70 weight percent of said particles of barium oxide, 30-40 weight percent of said particles of titanium dioxide and 0.2-5.0% weight percent of said particles of lanthanum hydroxide so as to form a mixture of particles;
heating the mixture of particles at a temperature in a range of 1150-1350° C. in a nitrogen atmosphere for a first predetermined amount of time so as to form a sintered mixture;
cooling the sintered mixture in the nitrogen atmosphere;
milling the sintered mixture to produce milled particles having diameters within a range of 50-700 nm;
mixing 95-99 weight percent of said milled particles and 1.0-5.0 weight percent of an alkali hydroxide selected from the group consisting of potassium hydroxide, sodium hydroxide, rubidium hydroxide and lithium hydroxide to form a composite dielectric material;
milling the composite dielectric material to produce a composite dielectric powder;
heating the composite dielectric powder in a nitrogen atmosphere at a temperature less than or equal to 850° C.;
cooling the composite dielectric powder in the nitrogen atmosphere;
thereafter mixing 70-80 weight percent of said composite dielectric powder and 20-30 weight percent of a liquid epoxy binder to produce a homogenous liquid mixture;
depositing a layer of the homogeneous liquid mixture onto a substrate; and
processing the substrate and said layer to remove liquid portions of the homogeneous liquid mixture.

16. The method according to claim 15 further comprising mixing a surfactant with the homogeneous liquid mixture so as to lower the viscosity of the liquid epoxy binder and increase the dissolution of the composite dielectric powder in the liquid epoxy binder.

17. A method of manufacturing a humidity sensor, the method comprising:
providing particles of barium oxide, titanium dioxide and lanthanum hydroxide, wherein all of said particles have an average grain diameter in a range of 20-120 nanometers;
mixing 60-70 weight percent of said particles of barium oxide, 30-40 weight percent of said particles of titanium dioxide and 0.2-5.0% weight percent of said particles of lanthanum hydroxide so as to form a mixture of particles;

heating the mixture of particles in a nitrogen atmosphere at a first predetermined temperature for a first predetermined amount of time so as to form a sintered mixture;

cooling the sintered mixture in the nitrogen atmosphere;

milling the sintered mixture to produce milled particles having diameters within a range of 50-700 nanometers;

mixing 95-99 weight percent of said milled particles and 1.0-5.0 weight percent of an alkali hydroxide so as to form a composite dielectric material;

milling the composite dielectric material to form a composite dielectric powder;

heating the composite dielectric powder in a nitrogen atmosphere at a second predetermined temperature for a second predetermined amount of time;

cooling the composite dielectric powder in the nitrogen atmosphere;

mixing 70-80 weight percent of said composite dielectric powder and 20-30 weight percent of a liquid polymeric binder to form a homogenous liquid mixture;

providing a first electrode;

printing a layer of said homogeneous liquid mixture onto said first electrode;

processing said first electrode with said layer thereon to remove liquid portions of said homogeneous liquid mixture; and providing a second electrode on said layer after said liquid portions of said liquid mixture have been removed.

18. The method according to claim 17 wherein said layer has a thickness in a range of 30-50 micrometers.

19. A method of manufacturing a humidity sensor, the method comprising:

providing a substrate having a first electrode and a second electrode, wherein the first electrode and the second electrode are separated by an electrode gap;

providing particles of barium oxide, titanium dioxide and particles of lanthanum hydroxide, wherein all of said particles have an average grain diameter in a range of 20-120 nanometers;

mixing 60-70 weight percent of said particles of barium oxide, 30-40 weight percent of said particles of titanium dioxide and 0.2-5.0% weight percent of said particles of lanthanum hydroxide so as to form a mixture of particles;

heating the mixture of particles in a nitrogen atmosphere at a first predetermined temperature for a first predetermined amount of time so as to produce a sintered mixture;

cooling the sintered mixture in the nitrogen atmosphere;

milling the sintered mixture to produce milled particles having diameters within a range of 50-700 nanometers;

mixing 95-99 weight percent of said milled particles and 1.0-5.0 weight percent of an alkali hydroxide to provide a composite dielectric material;

milling the composite dielectric material to form a composite dielectric powder;

heating the composite dielectric powder in a nitrogen atmosphere at a second predetermined temperature for a second predetermined amount of time;

cooling the composite dielectric powder in the nitrogen atmosphere;

mixing 70-80 weight percent of said composite dielectric powder and 20-30 weight percent of a liquid polymeric binder to form a homogenous liquid mixture;

printing a layer of said homogeneous liquid mixture onto said substrate so as to fill the electrode gap and cover portions of the said first electrode and said second electrode; and processing said substrate with said layer thereon to remove liquid portions of said homogeneous liquid mixture.

20. The method according to claim 19 wherein said layer has a thickness in a range of 30-80 micrometers.

* * * * *